(12) United States Patent
Price (10) Patent No.: US 7,409,395 B2
(45) Date of Patent: *Aug. 5, 2008

(54) METHOD OF IMPROVING THE AVAILABILITY OF A COMPUTER CLUSTERING SYSTEM THROUGH THE USE OF A NETWORK MEDIUM LINK STATE FUNCTION

(75) Inventor: Daniel M. Price, Highland, UT (US)

(73) Assignee: EMC Corporation, Hopkinton, MA (US)

( * ) Notice: Subject to any disclaimer, the term of this patent is extended or adjusted under 35 U.S.C. 154(b) by 589 days.

This patent is subject to a terminal disclaimer.

(21) Appl. No.: 10/920,601

(22) Filed: Aug. 18, 2004

(65) Prior Publication Data

US 2005/0033778 A1    Feb. 10, 2005

Related U.S. Application Data (63) Continuation of application No. 09/855,592, filed on May 14, 2001, now Pat. No. 6,785,678.

(60) Provisional application No. 60/257,478, filed on Dec. 21, 2000.

(51) Int. Cl.
G06F 17/30 (2006.01)
G06F 7/00 (2006.01)

(52) U.S. Cl. .......................... 707/10; 709/223

(58) Field of Classification Search .............. 707/10; 709/223

See application file for complete search history.

(56) References Cited

U.S. PATENT DOCUMENTS 5,434,994 A * 7/1995 Shaheen et al. ............ 709/223
5,812,748 A   9/1998 Ohran et al.
5,828,889 A   10/1998 Moiin et al.

(Continued)

FOREIGN PATENT DOCUMENTS

EP    0760503    5/1997

(Continued)

OTHER PUBLICATIONS

Sun Cluster 2.2 Software Installation Guide, Sun Microsystems, Inc., Apr. 1, 199.*

(Continued)

*Primary Examiner*—Kuen S. Lu
(74) *Attorney, Agent, or Firm*—Workman Nydegger (57) ABSTRACT

A method for improving the availability and reliability of a computer clustering system having first and second servers that are connected to each other by a communication link and that each have an associated mass storage device. In one implementation, the method begins when the first server detects a loss of communication over the communication link from the second server to the first server that prevents the servers from communicating with each other. The first server then analyzes the communication link to determine if the communication link is functioning properly. If the communication link is functioning properly, then the first server continues operation, assuming a right to survive without communicating with the second server or with the mass storage device of the first server or with the mass storage device of the second server, and the first server services network requests that would otherwise be serviced by the second server.

24 Claims, 5 Drawing Sheets

U.S. PATENT DOCUMENTS

| | | |
|---|---|---|
| 5,884,018 A | 3/1999 | Jardine et al. |
| 5,892,895 A | 4/1999 | Basavaiah et al. |
| 5,948,109 A | 9/1999 | Moiin et al. |
| 5,978,565 A | 11/1999 | Ohran et al. |
| 5,991,518 A | 11/1999 | Jardine et al. |
| 5,999,712 A | 12/1999 | Moiin et al. |
| 6,002,851 A | 12/1999 | Basavaiah et al. |
| 6,108,699 A | 8/2000 | Moiin |
| 6,134,673 A | 10/2000 | Chrabaszcz |
| 6,145,089 A | 11/2000 | Le et al. |
| 6,151,688 A | 11/2000 | Wipfel et al. |
| 6,192,483 B1 | 2/2001 | Moiin et al. |
| 6,279,032 B1 | 8/2001 | Short et al. |
| 6,311,217 B1 | 10/2001 | Ehlinger |
| 6,338,112 B1 | 1/2002 | Wipfel et al. |
| 6,353,898 B1 | 3/2002 | Wipfel et al. |
| 6,385,625 B1 | 5/2002 | Slaughter |
| 6,393,485 B1 | 5/2002 | Chao et al. |
| 6,421,787 B1 | 7/2002 | Slaughter et al. |
| 6,438,705 B1 | 8/2002 | Chao et al. |
| 6,598,167 B2 * | 7/2003 | Devine et al. ............. 726/8 |
| 6,606,708 B1 * | 8/2003 | Devine et al. ............. 726/8 |
| 6,609,213 B1 * | 8/2003 | Nguyen et al. ............ 714/4 |
| 6,785,678 B2 | 8/2004 | Price |
| 6,983,317 B1 * | 1/2006 | Bishop et al. ........... 709/223 |
| 2002/0038301 A1 | 3/2002 | Aridor et al. |
| 2002/0049845 A1 | 4/2002 | Sreenivasan et al. |

FOREIGN PATENT DOCUMENTS

| | | |
|---|---|---|
| EP | 0 810 526 A1 | 12/1997 |
| JP | 11-175488 | 7/1999 |
| JP | 2000-040986 | 2/2000 |
| WO | WO 98/33121 A1 | 7/1998 |

OTHER PUBLICATIONS

Sun Cluster 2.2 System Administration Guide, Sun Microsystems, Inc., Mar. 22, 1999.*

Sun Cluster 2.2 Software Installation Guide, Sun Microsystems, Inc., Apr. 1, 1999.

Sun Cluster 2.2 Software Administration Guide, Sun Microsystems, Inc., Mar. 22, 1999.

Microsoft Corporation, Windows NT® Server, Server Operating System, "Cluster Stategy: High Availability and Scalability with Industrial-Standard Hardware," 1998.

Murray, P.T., et al, Somersault: Enabling Fault-Tolerant Distributed Software Systems, HP Laboratories Publication HPL-98-81, Apr. 1998.

Yang, C-L, et al., Hybrid Fault Diagnosability with Unreliable Communications Links, IEEE Transaction on Computers, vol. 37, No. 2, Feb. 1998.

Mori et al., PC Server Cluster—Focusing on Availability Cluster, IPSJ (Information Processing Society of Japan) Magazine, vol. 39, No. 1, Jan. 15, 1998, pp. 49-54.

Teshima, High Availability Tool for PC Server, Reducing Downtime to a Minimum by Using a Tool for Supporting a Recovery Operation, Nikkei Open Systems, Sep. 1995, No. 30, pp. 302-310.

DNCWARE ClusterPerfect (Solaris Version) Manual, Remote Disc Mirroring Edition, Dec. 15, 2000, pp. 1-239.

* cited by examiner

METHOD OF IMPROVING THE AVAILABILITY OF A COMPUTER CLUSTERING SYSTEM THROUGH THE USE OF A NETWORK MEDIUM LINK STATE FUNCTION

RELATED APPLICATIONS

This application is a continuation, and claims the benefit, of U.S. patent application Ser. No. 09/855,592, entitled A METHOD OF IMPROVING THE AVAILABILITY OF A COMPUTER CLUSTERING SYSTEM THROUGH THE USE OF A NETWORK MEDIUM LINK STATE FUNCTION, filed May 14, 2001, which, now U.S. Pat. No. 6,785,678 in turn, claims the benefit of U.S. Provisional Patent Application Ser. No. 60/257,478, entitled MAINTAINING OPERATION OF A NETWORK SERVER AFTER FAILURE OF ANOTHER NETWORK SERVER, filed Dec. 21, 2000. All of the aforementioned patent applications are incorporated herein in their respective entireties by this reference.

BACKGROUND OF THE INVENTION

1. The Field of the Invention

This invention relates to computer clustering systems and in particular to methods for improving the availability and reliability of computer clustering system resources and data in the event of loss of communication between computer clustering system servers.

2. Description of Related Art

A typical computer cluster includes two or more servers and one or more network devices in communication with each other across a computer network. During normal operation of a computer cluster, the servers provide the network devices with computer resources and a place to store and retrieve data. In current computer cluster configurations the computer cluster data is stored on a shared computer disk that is accessed by any of the network servers.

Figure 1:
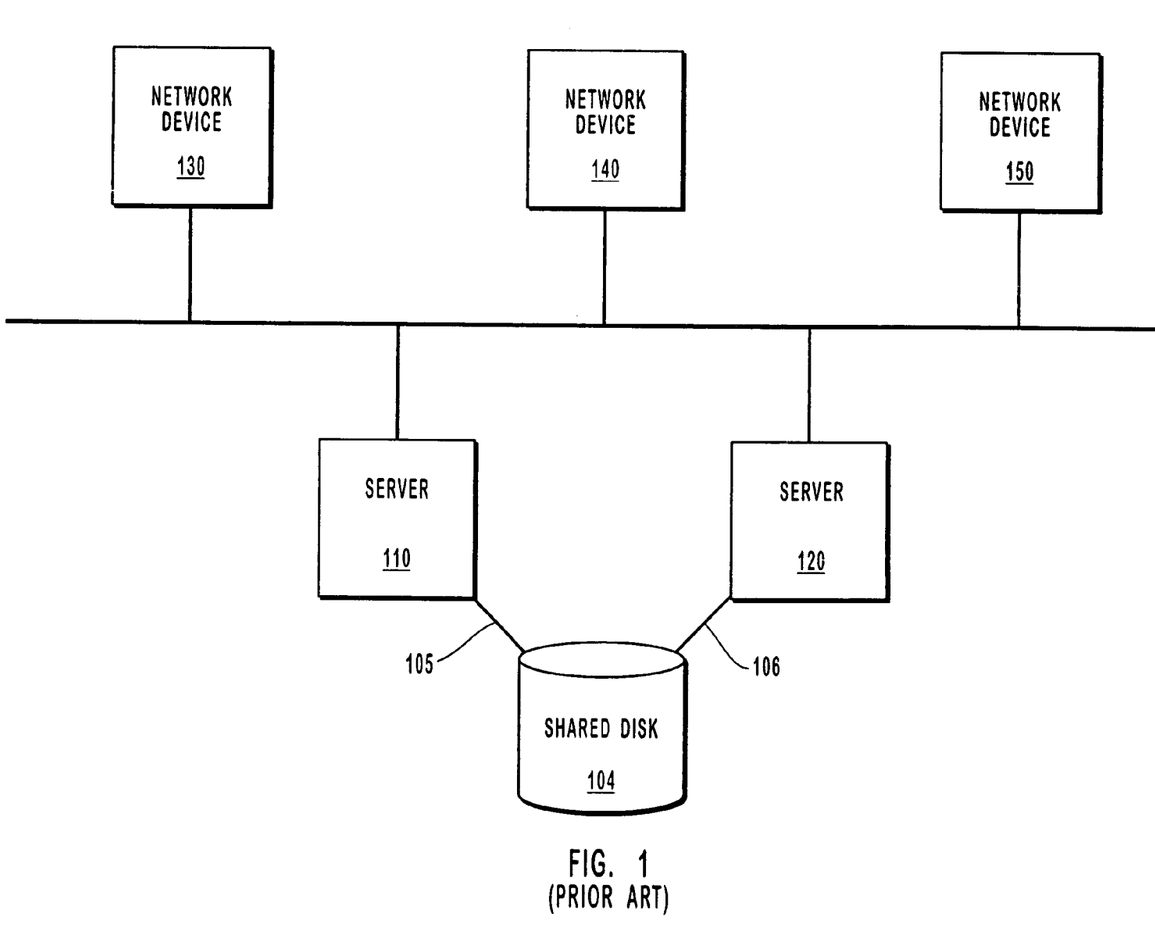
FIG. 1 is a block diagram illustrating a conventional computer cluster having servers that share a disk.

A typical computer cluster is illustrated in FIG. 1, which illustrates two network servers 110 and 120 in communication with network devices 130, 140, and 150 across computer network 101. Both network server 110 and network server 120 communicate with shared disk 104 across communication lines 105 and 106, respectively.

When using a computer cluster, it is often desirable to provide continuous availability of computer cluster resources, particularly where a computer cluster supports a number of user workstations, personal computers, or other network client devices. It is also often desirable to maintain uniform data between different file servers attached to a computer clustering system and maintain continuous availability of this data to client devices. To achieve reliable availability of computer cluster resources and data it is necessary for the computer cluster to be tolerant of software and hardware problems or faults. Having redundant computers and a mass storage device generally does this, such that a backup computer or disk drive is immediately available to take over in the event of a fault.

A technique currently used for implementing reliable availability of computer cluster resources and data using a shared disk configuration as shown in FIG. 1 involves the concept of quorum, which relates to a state in which one network server controls a specified minimum number of network devices such that the network server has the right to control the availability of computer resources and data in the event of a disruption of service from any other network server. The manner in which a particular network server obtains quorum can be conveniently described in terms of each server and other network devices casting "votes". For instance, in the two server computer cluster configuration of FIG. 1, network server 110 and network server 120 each casts one vote to determine which network server has quorum. If neither network server obtains a majority of the votes, shared disk 104 then casts a vote such that one of the two network servers 110 and 120 obtains a majority, with the result that quorum is obtained by one of the network servers in a mutually understood and acceptable manner. Only one network server has quorum at any time, which ensures that only one network server will assume control of the entire network if communication between the network servers 110 and 120 is lost.

The use of quorum to attempt to make network servers available in the event of a disruption will now be described. There are two general reasons for which server 110 can detect a loss of communication with server 120. The first is an event, such as a crash, at server 120, in which server 120 is no longer capable of providing network resources to clients. The second is a disruption in the communication infrastructure of network 101 between the two servers, with server 120 continuing to be capable of operating within the network. If server 110 can no longer communicate with server 120, its initial operation is to determine if it has quorum. If server 110 determines that it does not have quorum, it then attempts to get quorum by sending a command to shared disk 104 requesting the disk to cast a vote. If shared disk 104 does not vote for server 110, this server shuts itself down to avoid operating independently of server 120. In this case, server 110 assumes that network server 120 is operating with quorum and server 120 continues to control the computer cluster. However, if shared disk 104 votes for network server 110, this server takes quorum and control of the computer cluster and continues operation under the assumption that network server 120 has malfunctioned.

While the use of quorum to enable one of a plurality of network servers to continue providing network resources in the event of a disruption in the network is often satisfactory, the use of a shared disk places the entire network and the data stored on the disk at risk of being lost. For instance, if the shared disk 104, rather than one of the network servers 110 and 120 malfunctions, neither of the servers can operate, and the data may be permanently lost. Moreover, in a shared disk configuration the computer cluster servers are typically placed in close proximity to each other. This creates the possibility that natural disasters or power failures may take down the whole computer cluster.

BRIEF SUMMARY OF AN EXEMPLARY EMBODIMENT OF THE INVENTION

The present invention relates to a method for improving the availability and reliability of computer cluster resources and data in a computer clustering system. Two servers each having an associated disk communicate across a computer network. Each server is capable of providing computer cluster resources and accessing computer cluster data for all network devices attached to the computer network. In the event of loss of communication, each server has the ability to determine the reason for loss of communication and determine whether or not it should continue operation.

When a network server detects that communication with another network server is lost, the loss in communication can be due to either a failure of the communication link or a failure of the other network server. Because each network server has a mirrored copy of the network data, a loss in communication is followed by execution of a series of acts at each network server that remains operating to ensure that the network servers do not begin operating independently of each other. In the absence of these acts, multiple network servers operating independently of one another could exist in an undesirable "split brain" mode, in which data mirroring between the network servers is not performed, thereby resulting in potential data corruption.

When operation of the computer cluster is initiated, one server is assigned control of the computer cluster resources and data and is given a "right to survive" in the event that communication between the network servers is lost as a result in failure of the communication link. For convenience, the one network server that has the "right to survive" during normal operation is designated herein as a "primary" server and any server that is not does not have the right to survive during normal operation is designated as a "secondary" server. It is noted that the terms "primary" and "secondary" do not connote relative importance of the servers, nor do they refer to which server is primarily responsible for providing network resources to network devices. Under normal operation, primary and secondary servers can be interchangeable from the standpoint of providing network resources. The right to survive is used in a default protocol to ensure that the split brain problem does not arise if communication between network servers is lost.

When a primary network server detects loss of communication, the primary network server can continue operating, since it can assume that the other, secondary network server has failed or that the secondary network server will not continue operation. The series of acts performed by a secondary network server upon detecting loss of communication is somewhat more complex. Rather than simply ceasing operation, the secondary network server infers or determines whether the loss of communication is a result of a failure of the primary network server or a failure in the communication link. If the communication link is operational, the secondary network server concludes that the primary network server has failed and is not operating. In this case, the secondary network server continues operating substantially without the risk of causing the split brain problem. If, however, the secondary network server determines that communication link has failed, it assumes that the primary network server is operational. In response to this assumption, the secondary network server terminates operation to avoid operating in a split brain mode.

A significant benefit according to the invention is that a secondary server, which does not initially have right to survive, can continue operating if it determines that a loss of communication with the primary server is not caused by failure of the communication link. In the absence of any analysis of the communication link, the secondary server would be required to automatically shut down in response to a loss of communication with the primary server to avoid the split brain problem. It is noted that the foregoing methods of the invention for responding to loss of communication between servers enhances the reliability and availability of computer clusters in which each network server has a dedicated, mirrored disk or mass storage device, since the possibility of operating in a split brain mode does not force a secondary server to go off-line when a primary server fails.

Application of conventional "quorum" rules to computer clusters in which each network server has a dedicated, mirrored disk, is generally not optimal. For instance, in the case where a network server having quorum fails, there is no shared disk to cast a vote that would reassign quorum to the other network server. As a result, the direct application of conventional quorum rules to this type of computer cluster would result in the non-quorum network server unnecessarily shutting down upon failure of the network server having quorum.

Storing data in separate, mirrored disks greatly reduces the possibility of losing network data, which has been a problem frequently experienced in computer clusters having a single disk that is shared among network servers. Additionally, since servers do not share a single disk according to the invention, the location of the servers is not limited by the cable lengths associated with disk drive devices. Thus, network servers and their associated mirrored disks can be located remotely one from another. This reduces the chance that natural disasters or power failures may disable the entire computer cluster.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF EXEMPLARY
EMBODIMENTS OF THE INVENTION

The present invention relates to a method for improving the availability and reliability of computer cluster resources and data in a computer clustering system. The computer cluster includes at least two servers, each having a dedicated mass storage devices. The servers communicate with each other as well as other network devices across a computer network. Data is mirrored between the disks of each server so that network devices have access to reliable data in the event of one server failing. Communication modules operate on each server to determine whether a server should shut itself down in the event of a communication loss between the servers.

The term "right to survive" refers to whether or not a server has the right to continue operation in the event of a detected loss of communication between the servers due to an error in the communication link between the servers. For example, if loss of communication between the two servers is detected, and such loss is due to a physical break in the communication link, the server with the right to survive continues operation while the server without right to survive shuts itself down. As noted previously, a "primary" server is one that has the right to survive prior to loss of communication, whereas a "secondary" server is one that does not have the right to survive prior to the loss of communication between servers.

The term "split brain" refers to an undesirable condition in which the network servers of a computer cluster having dedicated mass storage devices for each network server act independently of each other and without mirroring. In the absence of the invention, this can occur when communication between the network servers is lost while both network servers are still running, and each node assumes that the other has failed. When split brain occurs, the mirrored data on each server no longer matches and can be corrupt. Referring to the above example where the servers lose communication due to a physical break in the communication link, if the servers could not determine the loss was due the physical break, each would continue to operate and write its own data to its associated mass storage device. However, since the communication link is broken, the data would not be mirrored and inconsistent data on the mass storage devices would result. The present invention prevents the computer cluster from operating in a split brain mode, while enabling the secondary server to continue operating if the loss of communication is caused by failure of the primary server.

Embodiments within the scope of the present invention also include computer-readable media for carrying or having stored thereon computer-executable instructions or data structures. Such computer-readable media can be any available media, which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 2:
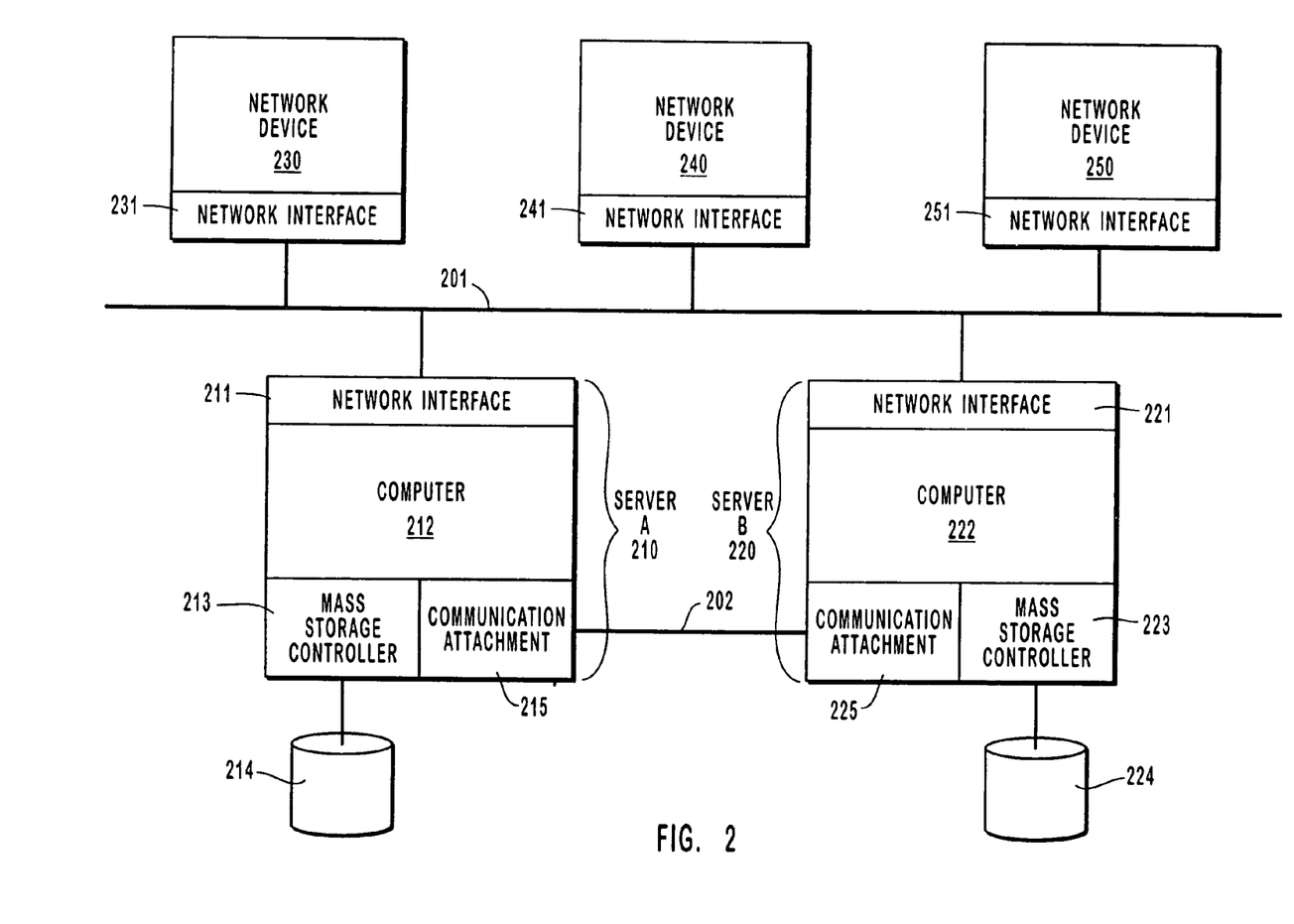
FIG. 2 illustrates an exemplary computer cluster that provides a suitable operating environment for the present invention.

FIG. 2 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local processing devices and remote processing devices that are linked (either by hardwired links, wireless links, or by a combination of hardwired or wireless links) through a communications network. In a distributed computing environment, program modules may be located in both local and remote memory storage devices.

FIG. 2 illustrates a representative computer cluster configuration in which the method of the invention can be practiced. The computer cluster includes two servers, which are designated as server A 210 and server B 220. Although only two servers are illustrated in FIG. 2, the general principles disclosed herein can be readily adapted to computer clusters having more than two network servers. Server A 210 and server B 220 both run a file operating system, which may be Microsoft Windows NT, although any of a variety of operating systems can be used with the invention. Server A 210 includes computer 212 connected to network 201 through network interface 211 and mass storage device 214 connected through mass storage controller 213. Likewise, server B 220 includes computer 222 connected to network 201 through network interface 220 and mass storage device 224 connected through mass storage controller 223. Network 201 can be an Ethernet, token ring, Arcnet, or any other network by which server A 210 and server B 220 can communicate with network devices 230, 240, and 250.

While it is not necessary for server A 210 to have identical components to server B 220, in many instances this will be the case. In other instances, server A 210 and server B 220 may have different processor types, different processor speeds, different size mass storage devices or any other number of hardware differences. All that is required of server A 210 and server B 220 is that they be capable of running the file operating system and that the drive on one of the servers not be so large that it cannot be mirrored to the other server.

In the embodiment illustrated in FIG. 2, communication between server A 210 and server B 220 is established using dedicated link 202. Computer 212 is connected with dedicated link 202 through communication attachment 215 and computer 222 is connected with dedicated link 202 through communication attachment 225. Dedicated link 202 can be implemented using a variety of techniques, well known to those skilled in the art. In one embodiment, dedicated link 212 is a link that uses an Ethernet protocol. Alternatives include using the serial communications ports of computers 212 and 222 programmed to run at high speeds or the parallel interfaces of computers 212 and 222. According to another alternative, dedicated link 202 and communication attachments 215 and 225 are not present, with the communication between server A 210 and server B 220 being established by a virtual circuit or channel carried across network 201. The specific type of hardware used to implement dedicated link 202 is not important, provided data transfer rates are comparable to the data transfer rates on mass storage devices 214 and 224 so performance of the system is not limited.

Network devices 230, 240 and 250 connect to network 201 through network interfaces 231, 241 and 251 respectively. These are client devices that use the resources of computer systems 210 and 220 to access data stored on the mass storage devices 214 and 224. Network devices 230, 240 and 250 can be any devices capable of communicating across network 201.

During operation of the computer cluster, both server A 210 and server B 220 are capable of providing resources to any of network devices 230, 240, or 250. Furthermore, both server A 210 and server B 220 are capable of sensing errors in the integrity of dedicated link 202. When a network device in communication with server A 210 adds, changes or deletes data from mass storage device 214, the update is mirrored across dedicated link 202 to mass storage device 224. Likewise, when a network device in communication with server B 220 adds, changes or deletes data from mass storage device 224 the update is mirrored across dedicated link 202 to mass storage device 214. Since the data is mirrored across dedicated link 202 in the embodiment of FIG. 2, it does not congest network 201.

A result of mirroring is that mass storage devices 214 and 224 contain identical copies of all the computer cluster data. Therefore, the computer cluster can continue to operate reliably if one of the mass storage devices malfunctions. If network devices 230, 240 and 250 cannot access data on mass storage 214 as a result of a malfunction of mass storage device 214, they may access the data on mass storage device 224 and vice versa. Since server A 210 and server B 220 do not share a mass storage device, there is no single point of failure and they may be remotely located from each other. Remotely locating server A 210 and server B 220 reduces the chance of a power outage or natural disaster preventing access to both mass storage devices simultaneously. Further details regarding the basic mirroring capabilities and general network architecture of the computer cluster of FIG. 2 are presented in U.S. Pat. No. 5,978,565 entitled "METHOD FOR RAPID RECOVERY FROM A NETWORK FILE SERVER FAILURE INCLUDING METHOD FOR OPERATING CO-STANDBY SERVERS," issued, Nov. 2, 1999, which is incorporated herein by reference.

When server A 210 and server B 220 are initially configured, one of the servers is assigned the right to survive by the operator. The right to survive in this instance is represented as a software flag and is set to either "on" or "off". In general, during normal operation of the computer cluster, the right to survive flag is set to "on" on one and only one of the servers. After the initial configuration, a server with its right to survive flag "off" may turn its right to survive flag "on" under certain network conditions, as will be disclosed in greater detail below.

If communication between the servers is lost, the right to survive is used in determining which server is to continue cluster operations and which server is to terminate cluster operations. There are two primary instances when loss of communication between server A 210 and server B 220 occurs. The first instance occurs when one of the servers ceases communicating across dedicated link 202 as a result, for example, of the server experiencing a software error or the server losing power. The second instance occurs when there is a failure in the integrity of dedicated link 202.

As stated above, server A 210 and server B 220 can distinguish between types of communication failure. In the following discussion, it is assumed that server B 220 is a primary server, meaning that it has right to survive during an initial period of normal operation of the computer cluster, while server A 210 is a secondary server that does not initially have right to survive. If the primary server B 220 detects a loss of communication from server A 210, server B 220 continues operating in view of its right to survive without regard to whether the loss of communication has been caused by a failure of communication link 202 or of server A 210.

When secondary server A 210 detects a loss of communication from server B 220, server A 210 discontinues operation unless it determines that it is safe for it to assume right to survive. If server A 210 determines that the loss of communication is due to a failure in communication link 202, server A 210 assumes that primary server B 220 is operational. Accordingly, because server A 210 does not have right to survive, it terminates its activity so as to avoid operating in a split brain mode. If, however, secondary server A 210 determines that communication link 202 has not failed, it assumes that the loss of communication is associated with primary server 220 B failing or otherwise no longer providing network services. In this case, secondary server A 210 assigns itself right to survive and continues operation without the risk of causing a split brain in the computer cluster. In the latter case, server A 210 can service requests for resources from network devices 230, 240, and 250 that would otherwise be made to the failed server B 220 In any of the foregoing situations, only one server continues to function after loss of communication is experienced between the servers, which prevents the problem of split brain from occurring.

Figure 3:
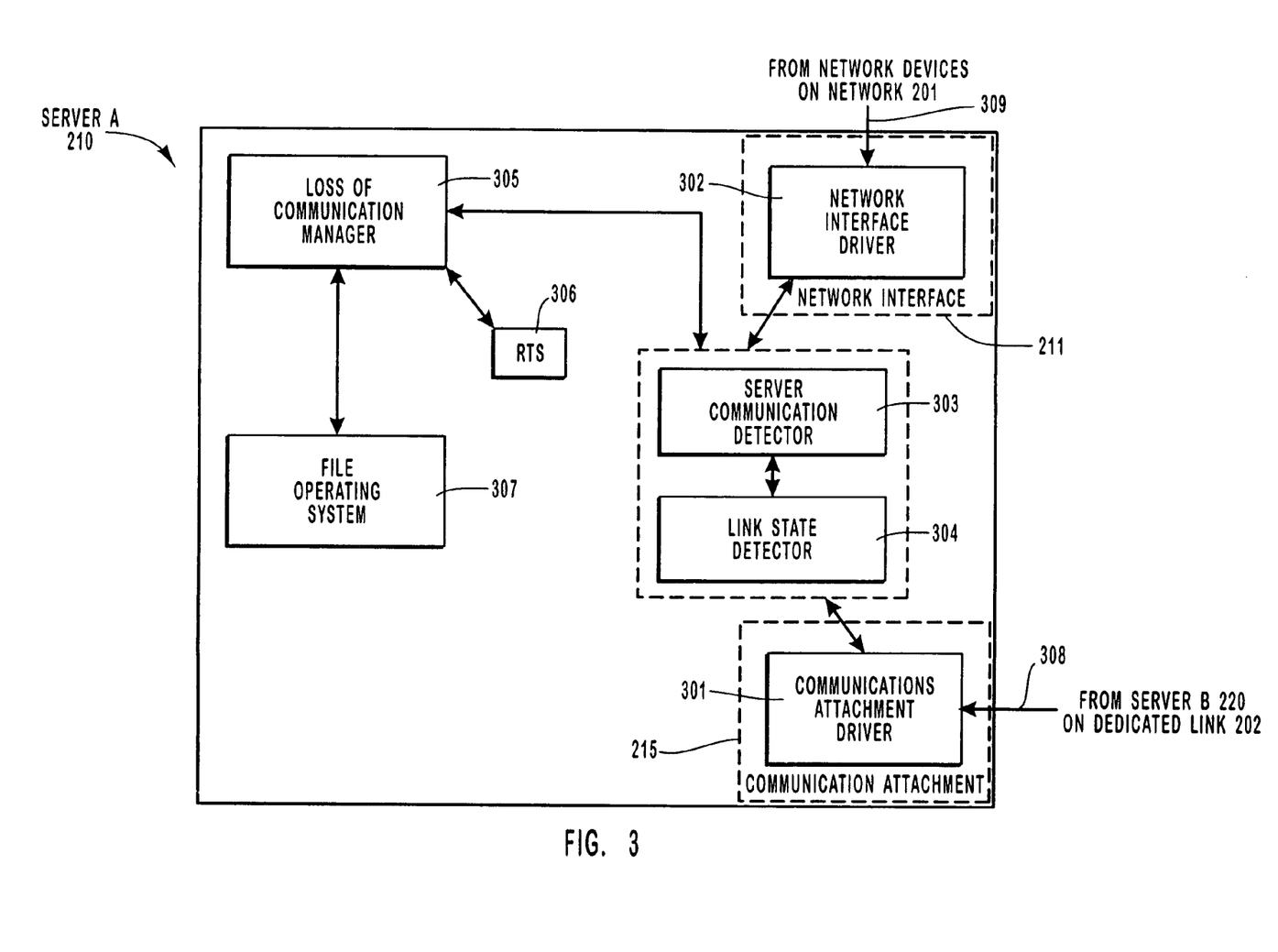
FIG. 3 illustrates communication between the different software modules in a server to enable the server to decide whether to assume right to survive.

FIG. 3 shows the interaction of different software modules running on a representative computer system according to one embodiment of the invention. The systems and structures of FIG. 3 represent one example of how server A 210 can determine whether it should continue functioning and assume the right to survive upon detecting loss of communication with the other server. Right to survive flag 306 is initially set, either automatically or by a system administrator when the operation of the computer cluster is initiated. As stated above, the server with its right to survive flag 306 set to "on" continues functioning in the event of loss of communication with another server, regardless of whether the cause is an error in the integrity of the dedicated link 202 or a failure of the other server. While the invention broadly disclosed herein extends to a primary server that has its right to survive flag 306 initially set in the "on" position and that subsequently continues operation after experiencing a loss of communication, FIG. 3 is discussed in detail below in the context of a secondary server that loses communication while the right to survive flag 306 is set in the "off" position.

As server A 210 operates in the computer cluster, the server receives and transmits data between components of the computer cluster as shown in FIG. 3. Data 308 is representative of a heartbeat signal of server B 220 communicated on dedicated link 202 to server A 210. As used herein, the term "heartbeat signal" extends to any signal or data having any format that can used by one server to determine whether another server is operational. Communication attachment driver 301 is a software module that controls communication attachment 215 and receives data 308. Likewise, data 309 is representative of data transmitted on network 201. Network interface driver 302 controls network interface 211 and receives data 309.

Server A 210 can use data 308 and the modules that process and analyze data 308 and dedicated link 210 to determine whether to continue or discontinue operation in response to a determination that communication with server B 220 has been lost at a moment at which right to survive flag 306 is set in the "off" position. Server A 210 includes a server communication detector that monitors communication with server B 220 to determine whether data 308 is being received as expected. Link state detector 304 is any hardware component, software component, or any combination thereof that is capable of determining if dedicated link 202 has failed when communication with server B 220 is lost. In many cases, server communication detector 303 and link state detector 304 can be separate modules, although the functionality of these two components can be combined in a single structure.

In this example, communication detector 303 and link state detector 304 monitor data 308 and the integrity of dedicated link 202. However, in the alternative embodiment in which communication with server B 220 is transmitted using network 201 and network interface driver 302 rather than using dedicated link 202, the server communication detector 303 and the link state detector 304 monitor data 309 and the integrity of network 201.

In either case, server communication detector 303 determines whether the heartbeat signal of server B 220 is detected. In the case of a loss of the heartbeat signal of server B 220, link state detector analyzes the integrity of the communication link that had been carrying the heartbeat signal (e.g., dedicated link 202 or network 201). When loss of communication with server B 220 is experienced, server communication detector 303 and link state detector 304 notify communication manager 305 of this fact and whether it appears that the communication link that had been carrying the heartbeat signal has failed. Loss of communication manager 305 then determines whether to shut server A 210 down or to permit server A to continue operating based on the right to survive flag 306 and the information received from server communication detector 303 and from link state detector 304.

To summarize the rules applied by loss of communication manager 305, server A 210 is permitted to continue operating if right to survive flag 306 indicates that server A 210 has the right to survive. Assuming, however, that server A 210 is a secondary server that does not have the right to survive according to right to survive flag 306 at the time that communication with server B 220 was lost, loss of communication manager 305 discontinues the operation of server A 210 if it has been determined that the loss of communication was a result of failure of the communication link. If loss of communication has been caused by failure of the communication link, it is assumed that server B 220 is operational, in which case, server A 210 discontinues operation, thereby avoiding the possibility of operating the computer cluster in a split brain mode.

In contrast, if loss of communication manager 305 determines that server A 210 detects a loss of communication from server B 220 and the communication link has not failed, loss of communication manager 305 infers that server B 220 has malfunctioning. Under the assumption that server A 210 is a secondary server, the right to survive flag 306 is then set to the "on" position, indicating that server A 210 has assumed the right to survive. In this case, server A 210 "reforms" the computer cluster by beginning to service requests previously made to server B 220. Server A 210 can do so by sending commands to network interface driver 302, causing network interface driver 302 to service requests that network devices have sent to server B 220 on network 201.

Figure 4:
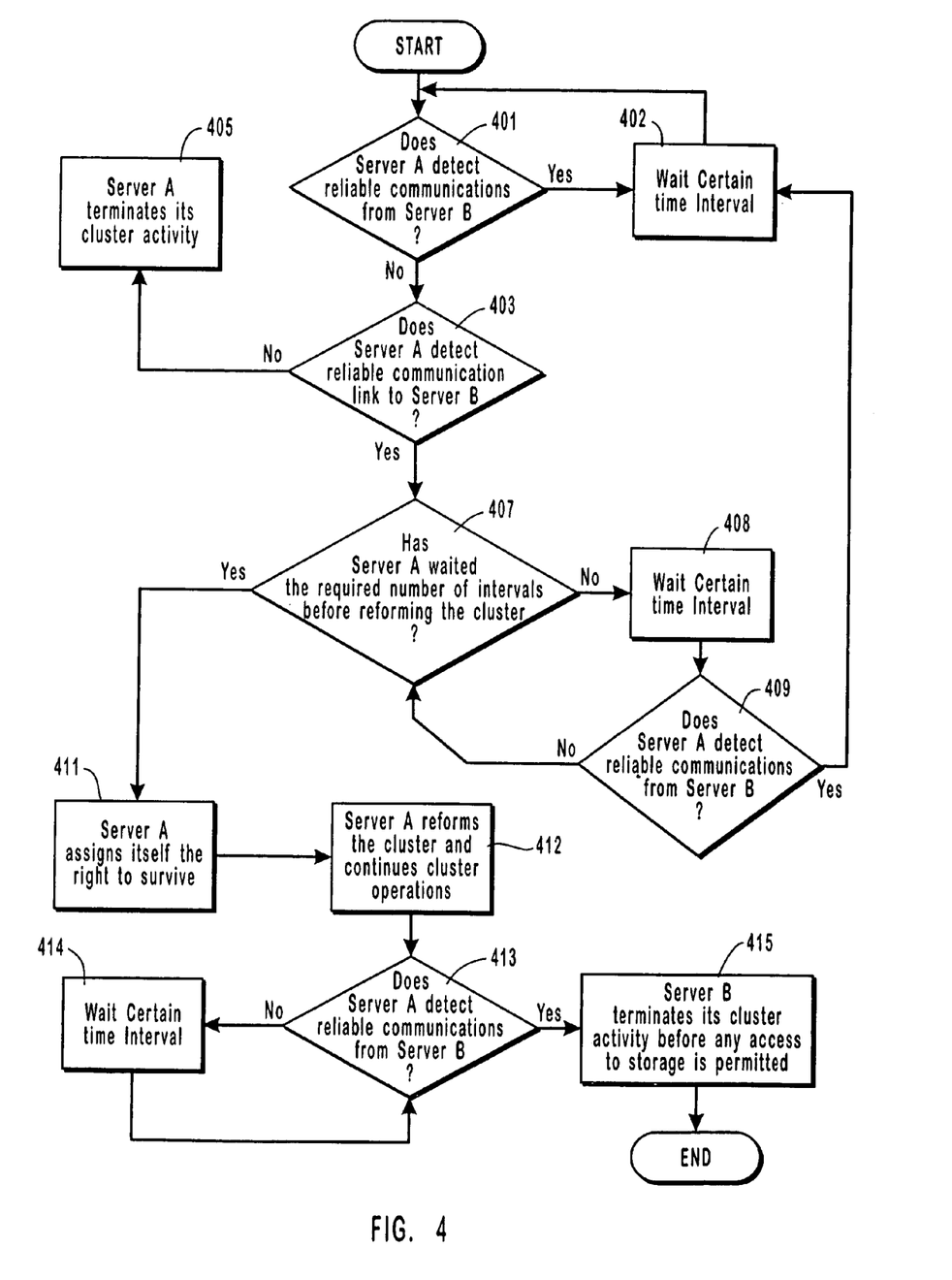
FIG. 4 is a flow diagram illustrating a method whereby a server determines whether it is to assume the right to survive upon detecting loss of communication with the other server.

FIG. 4 is a flow diagram showing steps performed at a secondary server (i.e., a server that does not already have the right to survive) in a computer cluster according to one embodiment of the invention for increasing the availability of a network resources in the event of a failure of a primary server (i.e., a server initially having the right to survive). It is noted that a primary server generally does not need to perform the steps illustrated in FIG. 4 upon losing communication with a secondary server, as the right to survive possessed by primary server enables it to continue operating regardless of the reason for the loss of communication, as will be described below in greater detail in reference to FIG. 5.

Turning first to FIG. 4, the secondary server A attempts to detect reliable communication with server B in decision block 401. If server A can detect reliable communication with server B, the method proceeds to step 402, in which server A waits a certain time interval and then repeats decision block 401.

If server A does not detect reliable communication with server B in decision block 401, server A checks the reliability of the communication link in decision block 403. If server A does not detect a reliable communication link in decision block 402 server A terminates cluster activity at step 405 so as to avoid operating in a split brain mode.

If, however, server A does detect a reliable communication link at decision block step 403, the method proceeds to decision block 407, in which it is determined whether server A has waited the required number of time intervals before it can assume that server B has failed. If, according to decision block 407, server A has not waited the required number of time intervals, the method advances to step 408, in which server A waits for one time interval. After waiting during the time interval of step 408, server A attempts to detect reliable communication once again with server B in decision block 409. If server A detects reliable communication with server B in step 409, the method returns to step 402. Repeatedly checking for reestablished communication according to the loop defined by steps 407, 408, and 409 before reforming the cluster prevents short duration non-fatal software errors in server B from causing server A to begin operating in the place of server B.

If server A fails to detect reliable communication from server B after a required number of attempts, server A assigns itself the right to survive in step 411 then reforms the cluster in step 412. After server A reforms the cluster in step 412, it once again starts checking for reliable communication from server B at decision block 413. If server B recovers from a non-terminating software error it might resume transmitting a heartbeat signal and otherwise communicating with server A after the cluster has been reformed. So long as communication from server B is not detected, server A continues operating and periodically monitors for communication from server B in the loop illustrated by decision block 413 and step 414. If communication from server B is reestablished as detected at decision block 413, processing advances to step 415, in which server B is shut down in step 415 before any disk access is permitted, thereby avoiding operation in a split brain mode and the associated data inconsistencies on the mass storage devices of server A and server B.

Figure 5:
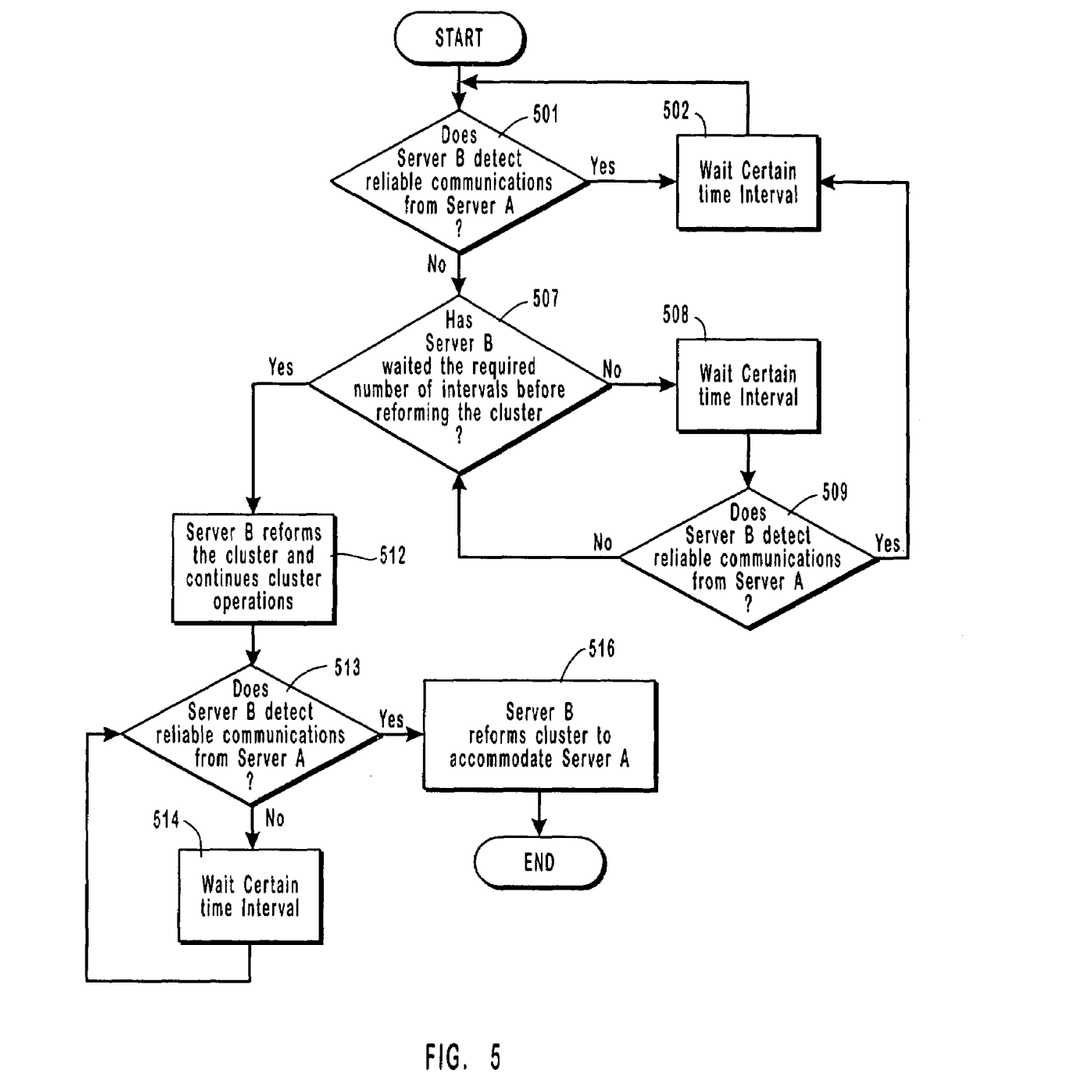
FIG. 5 is a flow diagram illustrating a method whereby a server having the right to survive responds to a failure in another server in a computer cluster.

A primary server having right to survive performs the steps of the method of FIG. 5 to respond to a loss of communication from another server according to one embodiment of the invention. In decision block 501, the primary server B attempts to detect reliable communication with server A. If server B can detect reliable communication with server A, the method proceeds to step 502, in which server B waits a certain time interval and then repeats decision block 501.

If server B does not detect reliable communication with server A in decision block 501, the method proceeds to decision block 507, in which it is determined whether server B has waited the required number of time intervals before it can assume that server A has failed. If, according to decision block 507, server B has not waited the required number of time intervals, the method advances to step 508, in which server B waits for one time interval. After waiting during the time interval of step 508, server B attempts to detect reliable communication once again from server A in decision block

509. If server B detects reliable communication with server A in step 509, the method returns to step 502. Repeatedly checking for reestablished communication using the loop defined by steps 507, 508, and 509 before reforming the cluster prevents short duration non-fatal software errors in server A from causing server B to begin operating in the place of server A.

If server B fails to detect reliable communication from server A after a required number of attempts, server B reforms the cluster in step 512. After server B reforms the cluster in step 512, it once again starts checking for reliable communication from server A at decision block 513. If server A recovers from a non-terminating software error it might resume transmitting a heartbeat signal and otherwise communicating with server B after the cluster has been reformed. So long as communication from server A is not detected, server B continues periodically monitoring for communication from server A in the loop illustrated by decision block 513 and step 514. If communication from server A is reestablished as detected at decision block 513, processing advances to step 516, in which server B reforms the cluster to accommodate the resumed operation of server A.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for improving the availability and reliability of a computer clustering system having first and second servers that are connected to each other by a communication link and that each have an associated mass storage device, the method comprising:
   the first server detecting, over the communication link, a loss of communication between the first and second servers;
   the first server analyzing the communication link to determine if the communication link is functioning properly; and
   if the communication link is determined to be functioning properly, the first server:
      continuing operation;
      assuming a right to survive without communicating with the second server or with the mass storage device of the first server or with the mass storage device of the second server;
      servicing a network request that would otherwise be serviced by the second server; and
      the first server discontinuing operation if the communication link is determined to be not functioning properly.

2. The method as recited in claim 1, wherein the right to survive is associated with the second server prior to any assumption of the right to survive by the first server.

3. The method as recited in claim 1, wherein detecting a loss of communication over the communication link comprises determining that a heartbeat signal associated with the second server cannot be detected on the communication link.

4. The method as recited in claim 1, wherein detecting a loss of communication over the communication link comprises:
   the first server attempting to communicate with the second server across the communication link; and
   the first server analyzing the results of the attempted communication across the communication link to determine the servers cannot communicate with each other.

5. The method as recited in claim 1, further comprising servicing, with the second server, any network requests made to the first server after the first server discontinues operation.

6. The method as recited in claim 1, wherein analyzing the communication link to determine if the communication link is functioning properly comprises checking at least one transmission characteristic associated with the communication link to determine if the at least one transmission characteristic is within specified parameters.

7. The method as recited in claim 1, wherein the servicing of a network request that would otherwise be serviced by the second server is facilitated by reconfiguration of the computer clustering system, the reconfiguration being performed by the first server.

8. The method as recited in claim 1, further comprising determining, prior to the detection of the loss of communication, that the first and second server cannot mirror changes to the mass storage devices.

9. The method as recited in claim 1, further comprising mirroring, with the first server, the mass storage device of the first server with a mass storage device of the second server, the mirroring being performed over the communication link.

10. The method as recited in claim 1, further comprising mirroring data from the mass storage device of the second server to the mass storage device of the first server.

11. The method as recited in claim 1, further comprising:
   the first server determining that communication from the second server is restored; and
   the second server discontinuing operation.

12. The method as recited in claim 1, further comprising monitoring, with the first server, the communication link.

13. A computer program product for implementing a method for improving the availability and reliability of a computer clustering system having first and second servers that are connected to each other by a communication link and that each have an associated mass storage device, the computer program product comprising: a computer-readable medium having computer-executable instructions stored upon and executed by a computer processor for implementing the method, the method comprising:
   the first server detecting, over the communication link, a loss of communication between the first and second servers;
   the first server analyzing the communication link to determine if the communication link is functioning properly; and
   if the communication link is determined to be functioning properly, the first server:
   continuing operation;
   assuming a right to survive without communicating with the second server or with the mass storage device of the first server or with the mass storage device of the second server;
   servicing a network request that would otherwise be serviced by the second server; and
   the first server discontinuing operation if analysis of the communication link indicates that the communication link is not functioning properly.

14. The computer program product as recited in claim 13, wherein the right to survive is associated with the second server prior to any assumption of the right to survive by the first server.

15. The computer program product as recited in claim 13, wherein detecting a loss of communication over the communication link comprises determining that a heartbeat signal associated with the second server cannot be detected on the communication link.

16. The computer program product as recited in claim 13, wherein detecting a loss of communication over the communication link comprises:

the first server attempting to communicate with the second server across the communication link; and the first server analyzing the results of the attempted communication across the communication link to determine the servers cannot communicate with each other.

17. The computer program product as recited in claim 13, wherein the method further comprises servicing, with the second server, any network requests made to the first server after the first server discontinues operation.

18. The computer program product as recited in claim 13, wherein analyzing the communication link to determine if the communication link is functioning properly comprises checking at least one transmission characteristic associated with the communication link to determine if the at least one transmission characteristic is within specified parameters.

19. The computer program product as recited in claim 13, wherein the servicing of a network request that would otherwise be serviced by the second server is facilitated by reconfiguration of the computer clustering system, the reconfiguration being performed by the first server.

20. The computer program product as recited in claim 13, wherein the method further comprises determining, prior to the detection of the loss of communication, that the first and second server cannot mirror changes to the mass storage devices.

21. The computer program product as recited in claim 13, wherein the method further comprises mirroring, with the first server, the mass storage device of the first server with a mass storage device of the second server, the mirroring being performed over the communication link.

22. The computer program product as recited in claim 13, wherein the method further comprises mirroring data from the mass storage device of the second server to the mass storage device of the first server.

23. The computer program product as recited in claim 13, wherein the method further comprises:

the first server determining that communication from the second server is restored; and the second server discontinuing operation.

24. The computer program product as recited in claim 13, wherein the method further comprises monitoring, with the first server, the communication link.

* * * * *